T. J. DODGE.
SWIVEL.
APPLICATION FILED FEB. 20, 1917. RENEWED MAY 17, 1919.
1,313,372.
Patented Aug. 19, 1919.
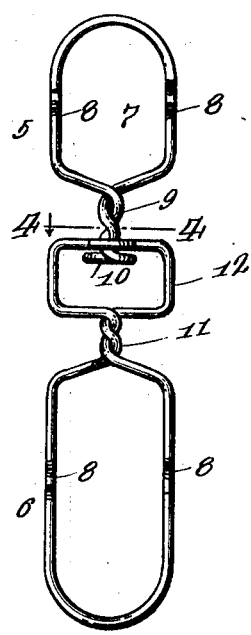
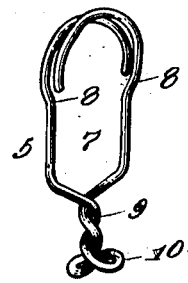
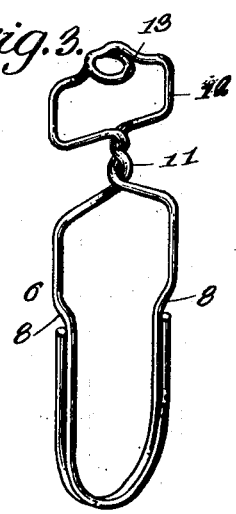
WITNESSES
INVENTOR
*Theodore J. Dodge.*
BY
ATTORNEY

UNITED STATES PATENT OFFICE.

THEODORE J. DODGE, OF OLYMPIA, WASHINGTON.

SWIVEL.

1,313,372.  Specification of Letters Patent.  Patented Aug. 19, 1919.

Application filed February 20, 1917, Serial No. 149,864. Renewed May 17, 1919. Serial No. 297,903.

*To all whom it may concern:*

Be it known that I, THEODORE J. DODGE, a citizen of the United States, residing at Olympia, in the county of Thurston and State of Washington, have invented certain new and useful Improvements in Swivels, of which the following is a specification.

This invention relates to swivels, and has for its main object to provide a simplified and improved means for connecting the ends of relatively rotatable members together so as to permit rotation or oscillation of the said members without danger of twisting, straining or breaking the said members.

A further object of the invention is to provide a swivel, to the rotatable sections of which may be readily and quickly attached the ends of the members to be connected.

A still further object of the invention is to provide a swivel which is of extremely inexpensive construction, which is arranged in such manner as to prevent jamming of the parts, which is so constructed as to permit of the ready attachment and detachment of the members to be connected, which shall prove strong and durable in use, and which will prove thoroughly efficient in the attainment of the ends for which it is designed.

With these objects in view, together with others which will appear as the description proceeds, the invention resides in the novel formation, combination and arrangement of parts, all as will be described more fully hereinafter, illustrated in the drawings, and particularly pointed out in the claims.

In the drawings:—

Figure 1 is an elevation of a swivel constructed and arranged in accordance with the invention;

Fig. 2 is a detail perspective view of one of the sections of the swivel;

Fig. 3 is a similar view of the other section of the swivel; and

Fig. 4 is a transverse sectional view taken substantially upon line 4—4 of Fig. 1.

The swivel embodying the present invention is of such construction as will enable the same to be readily attached to and detached from the ends of members to be rotatably connected, and yet forms a positive connector for the said members. The swivel is designed for general use, and may be employed efficiently as a connector for rope, chain, wire, cord, strap or harness, or bar ends.

Referring now more particularly to the drawings, 5 and 6 represent respectively the swivel sections. The section 5 is formed of a single strand of material, such as relatively heavy wire, the said strand being bent to provide a loop 7, the lateral sides of which are offset as at 8, and the ends of the strand are designed to lie within the said offset portions. This construction affords a protector for the strand ends, and prevents the said ends catching or hooking in the connector members, or any material which might engage the same. One end of the loop 5 is twisted to provide a central longitudinally disposed reduced portion or neck 9, at the end of which laterally disposed portions of the strand constitute a head 10.

The section 6 is preferably elongated as shown, and is also constructed of a single strand of material. This section has its ends arranged in a manner identical with that of the section 5, whereby the ends of the strand will be inclosed by the offset portions and protected. The loop is twisted inwardly from one end to provide a stem 11, the latter being of short duration, and a clevis portion 12 is provided at the extremity of the section and beyond the stem 11. The strand portion forming the clevis 12 is bent at the outer end of the clevis to provide a socket 13, the latter being in longitudinal alinement with the stem 11. The socket in the present instance is in the form of a relatively small loop, and is of a size to loosely accommodate the neck 9 of the section 5, but which prevents the head 10 sliding therethrough.

From the foregoing, it will be observed that I have provided an extremely simple and yet thoroughly practical swivel. The particular arrangement enables me to construct the clevis of inexpensive material, yet which will possess great strength. The manner in which the ends of the strands are positioned enables the sections to be readily attached to and detached from the members to be connected. It is also to be observed that the extremities of the strands are protected against becoming engaged with any surface with which they might contact when the device is in use. It will be observed furthermore that the particular clevis and head construction enables the sections to rotate relative to each other without danger of the sections becoming detached, and without possibility of the sections binding.

While the above is a description of the preferred embodiment of the invention, it is obvious that various changes in the minor details of construction and arrangement of parts may be resorted to, if desired, without departing from the spirit of the invention or exceeding the scope of the claims.

What is claimed is:—

1. In a swivel, a pair of sections each formed of a single strand of material, one of said sections being twisted at one end to form a neck, a head at the end of said neck, the remainder of said section being bent to form a loop, the side portions of said loop being offset, the ends of said strand resting in said offsets, and the other of said sections providing a socket for rotatably holding said neck, substantially as described.

2. In a swivel, a pair of sections each formed of a single strand of material, one of said sections being twisted adjacent one end to provide a stem, a clevis at one end of said stem, a socket in said clevis, a loop at the other end of said stem, the other of said sections comprising a loop and a head, the said head being rotatably supported in said socket, an offset portion on each of said loops, and the ends of said strands resting in said offsets, substantially as described.

In testimony whereof I affix my signature in presence of two witnesses.

THEODORE J. DODGE.

Witnesses:
J. E. STONEBURG,
J. B. CUTTER.

Copies of this patent may be obtained for five cents each, by addressing the "Commissioner of Patents, Washington, D. C."